3,689,240
PRODUCTION OF METHANE RICH GASES
Clyde L. Aldridge and David Buben, Baton Rouge, La., assignors to Esso Research and Engineering Company
No Drawing. Filed Mar. 18, 1971, Ser. No. 125,820
Int. Cl. C10j 3/00, 3/46
U.S. Cl. 48—202                                      6 Claims

ABSTRACT OF THE DISCLOSURE

A process for producing a methane-rich gas wherein carbonaceous material is steam gasified at temperatures between 1100 and 1400° F. and at pressures between 200 and 2000 p.s.i.g. with steam rates between 0.1 and 1.0 wt. $H_2O$/wt. carbon/hr. in the presence of an alkali metal salt catalyst composition.

BACKGROUND OF THE INVENTION

This invention relates to a novel and improved process for producing methane-rich gas.

With the increasing need for metane it has become highly desirable to find a new and improved process for more economically producing a methane-rich gas, in particular for producing gases containing more than 20 mole percent methane on a dry gas basis.

Previous work utilizing steam gasification processes to produce methane have not been successful in economically producing substantial quantities of methane because under the conditions necessary to operate the processes, unreacted steam reacts with methane as follows:

$$H_2O + CH_4 \rightleftharpoons 3H_2 + CO$$

thus reducing substantially the amount of recoverable methane.

It is therefore an object of this invention to overcome these and other prior art difficulties.

It is a particular object of this invention to steam gasify carbonaceous materials under a specific and critical set of conditions to produce a methane-rich gas.

These and other objects will be apparent from the ensuing description of the invention.

SUMMARY OF THE INVENTION

The aforementioned objects of this invention are accomplished by introducing steam and a carbonaceous material, with a steam rate between 0.1 and 1.0 wt. $H_2O$/wt. carbon/hr. into a reaction zone operating at a temperature between 1100 and 1400° F., a pressure between 200 and 2000 p.s.i.g., and containing a catalyst composition comprising an alkali metal salt, preferably $Cs_2CO_3$ or $K_2CO_3$. The catalyst composition may also comprise mixtures of alkali metal salts, preferably mixtures having $Cs_2CO_3$ and $K_2CO_3$ as the active catalytic component. Certain mixtures, such as $Cs_2CO_3$—$Li_2CO_3$, which form low-melting solutions, are especially preferred for use in the molten state at temperatures well below the melting points of $Cs_2CO_3$ or $K_2CO_3$.

PREFERRED EMBODIMENTS OF THE INVENTION

Suitable feedstocks would include coal, coal coke, peat, graphite, charcoal, petroleum coke from either a delayed or fluid coker, or a mixture of any of the above.

The feedstock is contacted with the alkali metal catalyst composition in a reaction zone and together they may be reacted in either a fixed bed, moving bed or fluidized bed in the reaction zone depending on which process configuration is desired. It is also possible to maintain the mixture in a molten bed form when the catalyst composition comprises mixtures of alkali metal compounds such as $Cs_2CO_3$—CsCl or $K_2CO_3$—$Li_2CO_3$. When a molten bed is used it is desirable to maintain the weight ratio of catalyst to carbonaceous feedstock between 1:1 and 100:1, and preferably between 5:1 and 50:1.

Regardless of the form in which the bed is maintained it is necessary that there be adequate contacting between the catalyst and the feedstock. This can be accomplished by many well known means, for example, stirring or fluidization.

The catalyst composition employed in the process of this invention comprises an alkali metal salt, such as Na, K, Li, Rb or Cs salts, which may be supported on an inert base, such as alpha or gamma alumina, silica, zirconia, magnesia, Alundum, mullite or the like; or supported by synthetically prepared or naturally occurring material, such as pumice, clay, kieselguhr, diatomaceous earth, bauxite or the like. The alkali metal salts preferred would include, for example, carbonates, acetates, formates, oxides and hydroxides. The most preferred supported catalysts would be either $K_2CO_3$ or $Cs_2CO_3$ supported on an alumina base. In another preferred embodiment no catalyst support would be used; only the catalytic alkali metal salt or salts would be employed. This is especially true when a molten salt bed is utilized. Preferred molten salt bed catalyst compositions would include mixtures of $K_2CO_3$ and KCl, $CsCO_3$ and CsCl, $K_2CO_3$ and $Li_2CO_3$ or $Cs_2CO_3$ and $Li_2CO_3$, although any catalytically-active mixture of alkali metal salt compounds which mixture is molten and stable under these reaction conditions may be used.

Steam is then injected into the bed comprising the feedstock and the catalyst under critical operating conditions to achieve the maximum production rate of methane possible while maintaining a high concentration of methane in the product gases by the following reactions:

$$C + H_2O \rightleftharpoons CO + H_2$$

$$CO + H_2O \rightleftharpoons CO_2 + H_2$$

$$3H_2 + CO \rightleftharpoons CH_4 + H_2O$$

In order to produce a gaseous stream that contains more than about 20 mole percent methane on a dry basis it is necessary that the rate of steam injection into the reaction zone, the temperature of the reaction zone and the pressure of the reaction zone be maintained within certain narrow ranges. For the process of this invention these ranges are tabulated below.

| | Broad | Preferred | Most preferred |
|---|---|---|---|
| Steam rate (wt. $H_2O$/wt. C./hr.) | 0.1–1.0 | 0.25–0.9 | 0.4–0.8 |
| Temperature (° F.) | 1,100–1,450 | 1,250–1,425 | 1,275–1,375 |
| Pressure (p.s.i.g.) | 200–2,000 | 400–1,000 | 400–900 |

The following examples illustrate the preferred embodiments of this invention and demonstrate the ability of this process to produce a gaseous stream which contains more than about 20 mole percent of methane on a dry gas basis.

Example I

To demonstrate the criticality of temperature in producing methane, a fluid petroleum coke was placed in a reactor along with a cesium carbonate catalyst composition. Steam was then injected into the reactor at a rate such that 40% of the steam was reacted, and the reactor maintained at a pressure between 800 and 1000 p.s.i.g. to produce a methane containing gas. The results of a series of such experiments at various temperatures is given in the following table.

TABLE I

| Run Number | Temperature (° F.) | Methane conc. (mole percent on dry product gas) |
|---|---|---|
| 1 | 1,100 | 38.3 |
| 2 | 1,200 | 33.5 |
| 3 | 1,300 | 27.5 |
| 4 | 1,400 | 21.5 |
| 5 | 1,500 | 14.1 |

From this data it is clear that a substantial decrease in methane concentration in the product takes place when the temperature rises above 1400° F. This is due to the fact that above 1400° F. the equilibrium:

$$CH_4 + H_2O \rightleftharpoons 3H_2 + CO$$

now favors the production of hydrogen and carbon monoxide, rather than methane. Therefore it is necessary to operate the process at temperatures under 1400° F. in order to produce a gaseous stream containing more than about 20 mole percent methane on a dry basis.

Example II

Although the mole percent methane in the gaseous stream increases as the temperature decreases, unfortunately the reaction rate of carbon with steam also decreases rapidly as the temperature decreases thus ultimately resulting in a reduction in the total amount of methane produced. Therefore, to insure a reasonable quantity of methane production, the reaction temperature must be maintained above 1100° F. as is shown more clearly by the following graph.

As in Example I the steam consumption rate and pressure were maintained within the same ranges and the temperature varied.

From the above curves it is seen that a temperature range between 1250° and 1425° F. insures that the gaseous stream will contain at least about 20 mole percent methane and that a reasonable reaction rate is maintained within these temperature limits. Furthermore it is seen that a temperature of about 1300° F. results in an optimum balance between the quantity of methane produced per unit time and the methane content of the product gas.

Example III

The effect of pressure on the methane content was determined in a procedure similar to that in Example I but where the temperature was maintained at about 1200° F. and the pressure varied.

TABLE II

| Run Number | Pressure (p.s.i.g.) | Methane content (Mole percent on dry gas product) |
|---|---|---|
| 6 | 0 | 1.7 |
| 7 | 150 | 15.8 |
| 8 | 400 | 23.3 |
| 9 | 700 | 27.7 |
| 10 | 850 | 29.0 |
| 11 | 1,000 | 30.1 |

From the above table it is clear that a sharp decrease in methane content is observed when the pressure is below about 400 p.s.i.g. and that there is no substantial increase in methane content if the pressure is increased above about 900 p.s.i.g.

Example IV

The effect of the third parameter, steam rate, on methane content is demonstrated below in Table III.

In a procedure similar to Example I, but where the temperature was held constant at about 1300° F. and the pressure between 700 and 900 p.s.i.g. and the steam conversion allowed to vary therewith, the following data were obtained.

TABLE III

| Run Number | Steam rate (wt. H$_2$O/ wt. C./hr.) | Methane content (Mole percent on dry gas product) |
|---|---|---|
| 12 | 0.1 | 26 |
| 13 | 0.25 | 24 |
| 14 | 0.5 | 23 |
| 15 | 1.0 | 20 |
| 16 | 5.0 | 11 |
| 17 | 10.0 | 9 |

From the above it is clear that at steam rates greater than 1.0 wt. H$_2$O/wt. C./hr. that the methane content of dry product gas is drastically reduced.

Having described and illustrated the process of this invention what we claim as new, useful, novel and unobvious is:

1. A process for producing a methane-rich gaseous stream which comprises contacting steam with carbonaceous material selected from the group consisting of coal, coal coke, petroleum coke, peat, graphite, charcoal and mixtures thereof, in a reaction zone and in the presence of a catalytic composition comprising an alkali metal salt wherein the steam is introduced into the reaction zone at a rate between about 0.1 and about 1.0 weight H$_2$O/wt. carbon/hr. and the reaction zone is maintained at a temperature between about 1100° and about 1450° F. and a pressure between about 200 and 2000 p.s.i.g.

2. A process according to claim 1 wherein the alkali metal salt is K$_2$CO$_3$ or Cs$_2$CO$_3$.

3. A process according to claim 1 wherein the catalytic composition is a supported alkali metal salt.

4. A process according to claim 3 wherein the catalytic composition is K$_2$CO$_3$ supported on an alumina base.

5. A process according to claim 3 wherein the catalytic composition is Cs$_2$CO$_3$ supported on an alumina base.

6. A process according to claim 1 wherein the catalytic composition comprises a mixture of K$_2$CO$_3$ and KCl, a mixture of Cs$_2$CO$_3$ and CsCl, a mixture of K$_2$CO$_3$ and Li$_2$CO$_3$, or a mixture of CsCO$_3$ and Li$_2$CO$_3$.

References Cited

UNITED STATES PATENTS

| 3,115,394 | 12/1963 | Gorin et al. | 48—202 X |
| 3,252,773 | 5/1966 | Solomon et al. | 48—202 |
| 3,503,724 | 3/1970 | Benson | 48—202 X |

MORRIS O. WOLK, Primary Examiner

R. E. SERWIN, Assistant Examiner

U.S. Cl. X.R.

48—214; 252—454